(12) United States Patent
Motomura et al.

(10) Patent No.: US 10,464,003 B2
(45) Date of Patent: Nov. 5, 2019

(54) FILTER (71) Applicant: Panasonic Intellectual Property Management Co., Ltd., Osaka (JP)

(72) Inventors: Koji Motomura, Osaka (JP); Hiroto Sumida, Nara (JP); Takahiko Murata, Osaka (JP); Takatoshi Mitsushima, Nara (JP); Keiji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 303 days.

(21) Appl. No.: 15/696,221

(22) Filed: Sep. 6, 2017

(65) Prior Publication Data
US 2018/0093214 A1  Apr. 5, 2018

(30) Foreign Application Priority Data

Sep. 30, 2016 (JP) .................................. 2016-194758

(51) Int. Cl.
| B01D 53/02 | (2006.01) |
| B01D 46/00 | (2006.01) |
| B01D 46/52 | (2006.01) |
| B01D 53/04 | (2006.01) |

(52) U.S. Cl.
CPC ....... *B01D 46/0036* (2013.01); *B01D 46/521* (2013.01); *B01D 53/0407* (2013.01); *B01D 2257/708* (2013.01); *B01D 2259/4508* (2013.01)

(58) Field of Classification Search
CPC ...... B01D 2257/708; B01D 2259/4508; B01D 46/0036; B01D 46/521; B01D 53/0407
See application file for complete search history.

(56) References Cited

U.S. PATENT DOCUMENTS

| 2003/0207635 A1* | 11/2003 | Minemura ......... B01D 39/1623 442/327 |
| 2005/0000363 A1* | 1/2005 | Minemura ............. A61L 9/014 96/154 |
| 2008/0241505 A1 | 10/2008 | Kobori et al. |
| 2013/0037481 A1 | 2/2013 | Lalouch et al. |

FOREIGN PATENT DOCUMENTS

| JP | 2001-038116 A | 2/2001 |
| JP | 2002-248309 A | 9/2002 |
| JP | 2004-113433 A | 4/2004 |
| JP | 2008-264522 A | 11/2008 |
| JP | 2009-190269 A | 8/2009 |
| JP | 2013-063377 A | 4/2013 |
| JP | 2013-528711 A | 7/2013 |

* cited by examiner

*Primary Examiner* — Christopher P Jones
(74) *Attorney, Agent, or Firm* — Pearne & Gordon LLP (57) ABSTRACT

There is provided a filter which includes a fiber layer and an adsorbent. The fiber layer includes fiber. The adsorbent is held in the fiber and adsorbs a chemical substance. The filter is divided into a plurality of sections by a fold. Each of the plurality of sections includes a first end portion positioned along the fold, a center portion adjacent to the first end portion, and a second end portion which counterposes the first end portion with the center portion interposed. The density of the adsorbent at the center portion is greater than the density of the adsorbent at the first end portion and at the second end portion.

9 Claims, 4 Drawing Sheets

FILTER

BACKGROUND

1. Technical Field

The present disclosure relates to a pleated filter and to a filter used, for example, as a filter material of an air cleaner.

2. Description of the Related Art

Recently, a function of adsorbing chemical substances in the air in addition to a function of dust collection is required for a filter material used in an air cleaner or the like. In particular, formaldehyde acts as a cause substance of a sick house syndrome and also causes social issues. PTL 1 and PTL 2 disclose a filter in which an adsorbent that adsorbs a chemical substance is dispersed in a space between a base layer and a surface layer.

CITATION LIST

Patent Literature

PTL 1: Japanese Patent Unexamined Publication No. 2002-248309

PTL 2: Japanese Patent Unexamined Publication No. 2009-190269

SUMMARY

There is provided a filter which includes a fiber layer and an adsorbent. The fiber layer includes fiber. The adsorbent is held in the fiber and adsorbs a chemical substance. The filter is divided into a plurality of sections by a fold. Each of the plurality of sections includes a first end portion positioned along the fold, a center portion adjacent to the first end portion, and a second end portion which counterposes the first end portion with the center portion interposed. The density of the adsorbent at the center portion is greater than the density of the adsorbent at the first end portion and at the second end portion.

DETAILED DESCRIPTIONS

A filter is generally pleated and is used as a filter material of, for example, an air cleaner. The reason is because the surface area of the filter is increased and dust collection efficiency is improved by forming a fold through pleating. However, air permeability is low in the vicinity of the fold formed by pleating, and this acts as a factor of increasing pressure loss. If an adsorbent is disposed in the vicinity of the fold, the pressure loss is more increased. In addition, even if the adsorbent is disposed in the vicinity of the fold, in which air permeability is low, adsorption performance is not sufficiently exhibited and absorption efficiency of a chemical substance is decreased.

A filter according to an exemplary embodiment includes a fiber layer and an adsorbent. The fiber layer includes fiber. The adsorbent is held in the fiber and adsorbs a chemical substance. Being held in the fiber means that the adsorbent is in contact with the fiber. The filter is pleated, and is divided into a plurality of sections (generally, rectangle) by a fold which is obtained by pleating. When one section is partitioned into two end portions positioned along the fold and a center portion interposed between the two end portions, mass (density A1) of the adsorbent held in the fiber in the fiber layer at the center portion per unit area is greater than mass (density A2) of the adsorbent held in the fiber of the fiber layer at the end portion per unit area. That is, the adsorbent is concentrated on the center portion which is a region other than the vicinity of the fold. Structurally, the air permeability is low in the vicinity of the fold, and the vicinity of the fold does not largely contribute to dust collection performance and adsorption performance. Meanwhile the air permeability at the center portion is high. Since the adsorbent is concentrated at the center portion at which air permeability is high, the adsorption performance of the adsorbent is effectively exhibited and the adsorption efficiency is improved. Further, since the amount of the adsorbent disposed in the vicinity of the fold is reduced, an increase of pressure loss, which occurs by disposing the adsorbent in the vicinity thereof is suppressed.

Figure 1A:
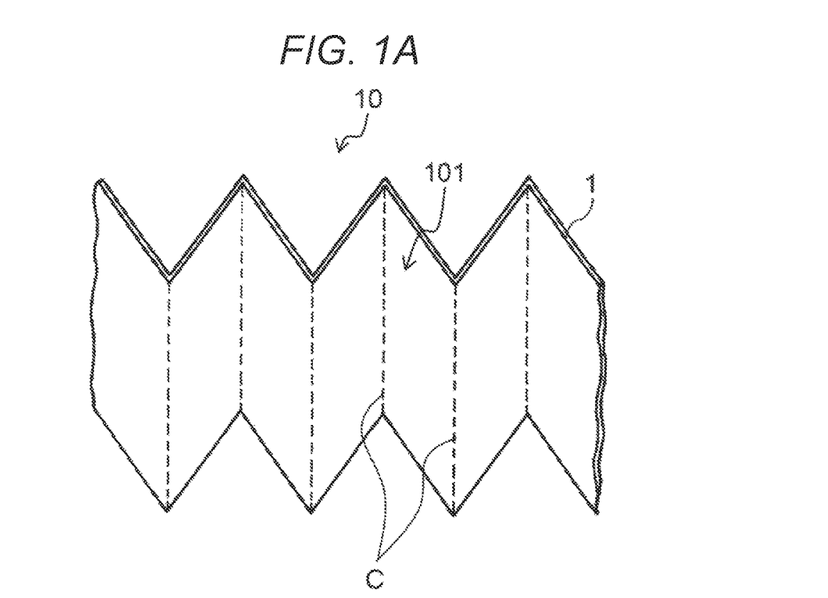
FIG. 1A is a perspective view schematically illustrating a pleated filter according to an exemplary embodiment.
Figure 1B:
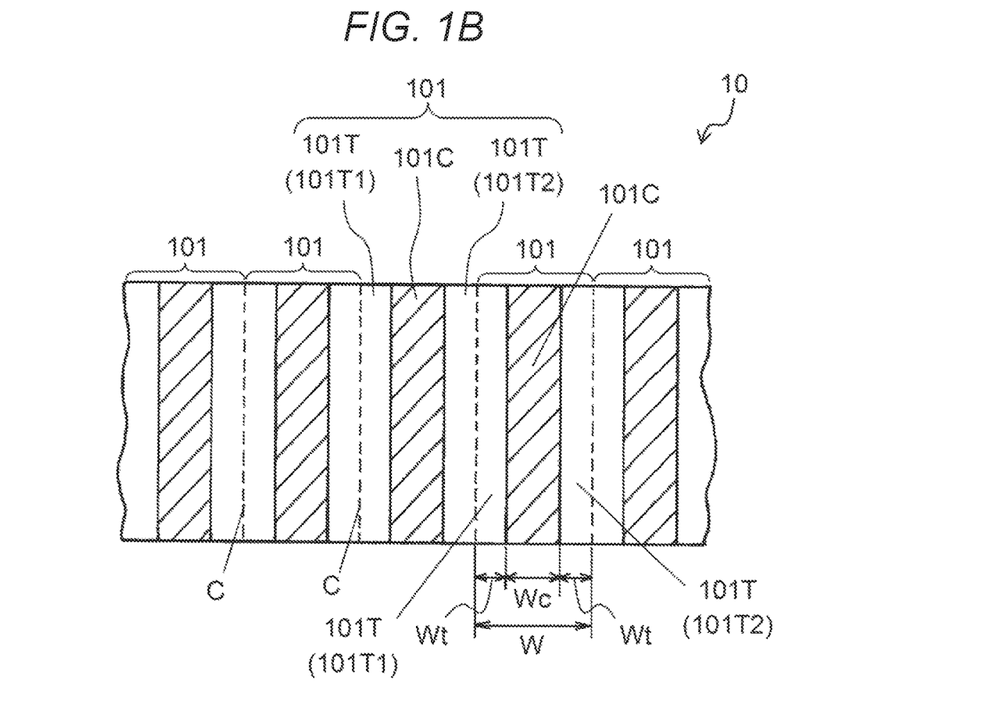
FIG. 1B is a plan view schematically illustrating the filter according to the exemplary embodiment, when the fold is spread out.

Hereinafter, regarding the filter according to the exemplary embodiment, a form suitable for a filter material of an air cleaner will be specifically described with reference to the drawings. However, the application of the filter is not limited thereto. FIG. 1A is a perspective view schematically illustrating a filter 10 according to the exemplary embodiment. FIG. 1B is a plan view schematically illustrating the filter 10 when folds C are spread out. For convenience, in FIG. 1B, center portion 101C is illustrated with being hatched. Filter 10 includes a fiber layer 1 and an adsorbent (not illustrated). The fiber layer 1 includes fiber. The adsorbent is held in the fiber and adsorbs a chemical substance.

Fiber Layer

Fiber layer 1 is configured with fiber (referred to as first fiber below) and has a function of capturing dust. From a viewpoint of dust collection efficiency, average fiber diameter D1 of the first fiber is preferably smaller than or equal to 3 μm, more preferably smaller than or equal to 1 μm, and particularly preferably smaller than or equal to 500 nm. The average fiber diameter D1 is preferably greater than or equal to or 50 nm and more preferably greater than or equal to 100 nm. Such fiber layer 1 is obtained in a manner that first fiber is formed by using an electrospinning method and the formed fiber is deposited on a target. In this case, fiber layer 1 is formed to have a nonwoven fabric shape.

Average fiber diameter D1 refers to an average value of diameters of strands of the first fiber. The diameter of the first fiber refers to a diameter of a section perpendicular to a length direction of the first fiber. In a case where such a section is not circular, the greatest diameter may be considered as the diameter. The width in a direction perpendicular to the length direction of the first fiber when the fiber layer 1 is viewed from a normal direction of one main surface may be considered as the diameter of the first fiber. Average fiber diameter D1 is, for example, an average value of diameters of any 10 strands of the first fiber included in the fiber layer 1, at a certain place. The above descriptions are also applied to average fiber diameters D2 and D3 which will be described later.

Average mass of fiber layer 1 per unit area is preferably greater than or equal to 0.01 g/m² and smaller than or equal to 1.5 g/m², more preferably greater than or equal to 0.01 g/m² and smaller than or equal to 0.5 g/m², and particularly preferably greater than or equal to 0.03 g/m² and smaller than or equal to 0.1 g/m². If the mass of fiber layer 1 is in the above range, high dust collection efficiency is easily exhibited while the pressure loss is suppressed.

The thickness T1 of fiber layer 1 is preferably greater than or equal to 0.5 µm and smaller than or equal to 10 µm, and more preferably greater than or equal to 1 µm and smaller than or equal to 5 µm, from a viewpoint of the pressure loss. In a case where fiber layer 1 has a nonwoven fabric shape, thickness T1 of fiber layer 1 refers to an average value of thickness of nonwoven fabric at any 10 places. The thickness refers to a distance between two main surfaces of nonwoven fabric. Thickness T1 of fiber layer 1 which is nonwoven fabric is obtained as follows. A picture of a section of the nonwoven fabric is taken. When a line which causes a distance from any one point on one main surface of the nonwoven fabric to the other main surface to be shortest is drawn, an outside distance (outward dimension) between two strands of fiber which are at positions farthest from each other among strands of fiber on the line is obtained. The thickness of the nonwoven fabric is calculated by applying the similar manner to other any plural points (for example, 9 points). A numerical value obtained by averaging the values obtained as the thickness is set as the thickness of the nonwoven fabric. When the thickness is calculated, a binarized image may be used. The above descriptions are also applied to thicknesses T2 and T3 which will be described later.

The material of the first fiber is not particularly limited. For example, polymers as follows are exemplified: polyamide (PA), polyimide (PI), polyamideimide (PAI), polyether imide (PEI), polyacetal (POM), polycarbonate (PC), polyether ether ketone (PEEK), polysulfone (PSF), polyethersulfone (PES), polyphenylene sulfide (PPS), polytetrafluoroethylene (PTFE), polyarylate (PAR), polyacrylonitrile (PAN), polyvinylidene fluoride (PVDF), polyvinyl alcohol (PVA), polyvinyl acetate (PVAc), polypropylene (PP), polyester (for example, polyethylene terephthalate (PET) and polybutylene terephthalate), and polyurethane (PU). The above substances may be used singly or be used in combination which is greater than or equal to two kinds thereof. Among the substances, in a case where the first fiber is formed by an electrospinning method, PES is preferably used. From a point of easily reducing average fiber diameter D1, PVDF is preferably used.

Adsorbent

The adsorbent is held in the first fiber. The adsorbent is not particularly limited. For example, substances which can adsorb at least one of volatile organic compounds (VOC) such as formaldehyde, acetaldehyde, toluene, xylene, and ethyl acetate are exemplified. Specifically, an organic material such as adipic acid dihydrazide, activated carbon, zeolite, and the like are exemplified as the adsorbent.

The amount of the provided adsorbent is not particularly limited. From a viewpoint of the adsorption performance and the pressure loss, the amount of the provided absorbent is preferably 0.1 to 30 g/m², more preferably 0.5 to 20 g/m², and particularly 1 to 10 g/m².

The adsorbent is held in the first fiber, in a particulate form. An average particle size of particles in the adsorbent is not particularly limited. For example, the average particle size is preferably greater than or equal to 0.1 µm and more preferably greater than or equal to greater than 1 µm. The average particle size of the particles in the adsorbent is preferably smaller than equal to 1000 µm, more preferably smaller than or equal to 400 µm, further preferably smaller than or equal to 200 µm, and particularly preferably smaller than or equal to 100 µm. The average particle size refers to an average value of the greatest diameters of 10 particles of the adsorbent when fiber layer 1 including the adsorbent is viewed from a normal direction of one main surface.

Filter 10 is formed by performing pleating of fiber layer 1 so as to have a bellows shape. Therefore, filter 10 is divided into plurality of sections 101 by folds C which are obtained by pleating. Each of sections 101 is generally rectangular. When one section 101 is partitioned into two end portions 101T positioned along fold C and center portion 101C interposed between two end portions 101T, density A1 of the adsorbent at center portion 101C is greater than density A2 of the adsorbent at end portion 101T. That is, the adsorbent is concentrated on center portion 101C. That is, each of sections 101 includes first end portion 101T1 positioned along the fold, center portion 101C adjacent to first end portion 101T1, and second end portion 101T2 which counterposes first end portion 101T1 with center portion 101C interposed. The density of the adsorbent at center portion 101C is greater than the density of the adsorbent at first end portion 101T1 and at second end portion 101T2.

One of end portions 101T is a region from fold C to a distance which is smaller than or equal to 25% of width W (length in a direction perpendicular to fold C) of section 101. In other words, each of end portions 101T is a band-like region which is adjacent to fold C and occupies an area which is smaller than or equal to 25% of the area of section 101. Center portion 101C is a region interposed between two end portions 101T in same section 101. Width Wc of center portion 101C is greater than or equal to 50% of width W.

Width Wt of end portion 101T is not particularly limited so long as the area of end portion 101T is smaller than or equal to 25% of the area of section 101. Width Wt of end portion 101T may be appropriately set in accordance with the number of folds C, the angle of fold C, width W of section 101, or the like. From a viewpoint of improving the adsorption performance, width Wt of end portion 101T is preferably greater than or equal to 5% of width W of section 101. That is, the area of end portion 101T is preferably greater than or equal to 5% of the area of section 101. For example, in a case where width W of section 101 is greater than or equal to 20 mm and smaller than 30 mm, width Wt of end portion 101T may be set to 2 mm, for example. In a case where width W of section 101 is greater than or equal to 30 mm and smaller than or equal to 60 mm, width Wt of end portion 101T may be set to 4 mm, for example. Even in a case where width W of section 101 is smaller than 20 mm or in a case where width W of section 101 is greater than 60 mm, width Wt of end portion 101T may be appropriately set in consideration of width W. Widths Wt of two end portions 101T in same section 101 may be the same as each other or be different from each other.

Figure 2:
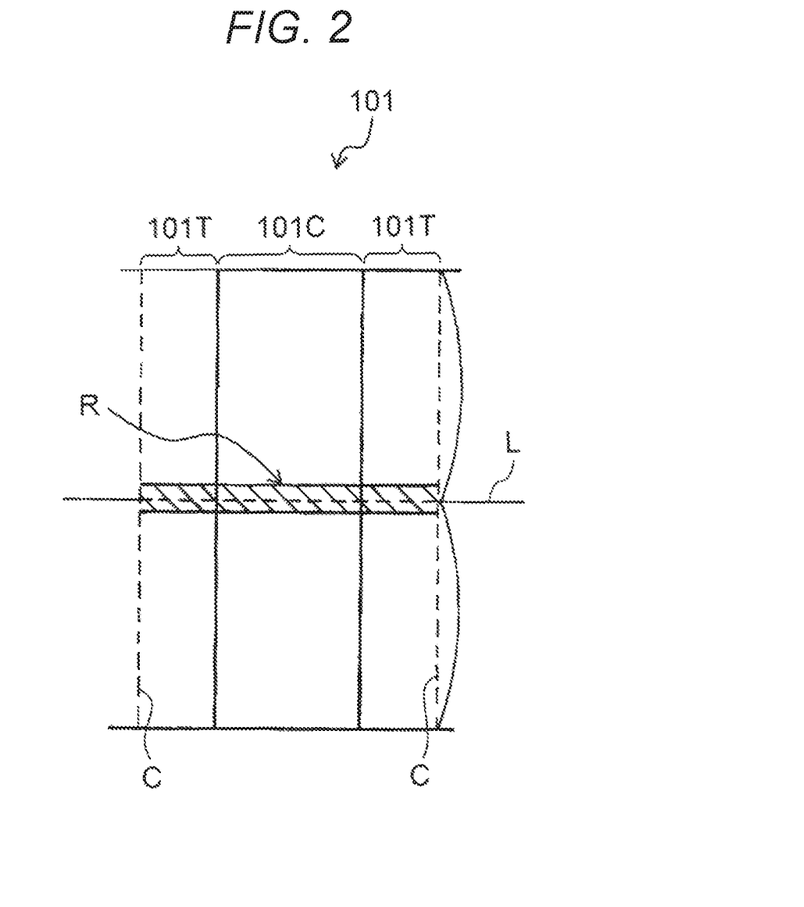
FIG. 2 is a top view schematically illustrating the filter according to the exemplary embodiment.

Density A1 and density A2 of the adsorbent can be replaced with area proportions of the adsorbent, which are calculated based on an enlarged image of one main surface of fiber layer 1, for example. That is, in a case where area proportion Rf1 of the adsorbent provided in a region corresponding to center portion 101C of fiber layer 1 is greater than area proportion Rf2 of the adsorbent provided in a region corresponding to end portion 101T, it is considered that the adsorbent is concentrated on center portion 101C. A ratio (Rf1/Rf2) of area proportion Rf1 and area proportion Rf2 is not particularly limited. For example, the ratio thereof is preferably greater than or equal to 1.1 and more preferably greater than or equal to 1.25. That is, density A1 of the adsorbent is preferably equal to or greater than 1.1 times density A2 of the adsorbent, and more preferably equal to or greater than 1.25 times thereof. Next, a method of calculating area proportion Rf1 of the adsorbent, which replaces density A1 will be described with reference to FIG. 2. FIG. 2 is a top view schematically illustrating the filter according to the exemplary embodiment. A method of calculating area proportions Rf1 and Rf2 of the adsorbent will be described with reference to FIG. 2. Firstly, any one section 101 is selected from filter 10. Considering width W of selected section 101, center portion 101C and two end portions 101T are determined. Subsequently, band-like calculation region R is set in a direction perpendicular to fold C, so as to include a center line L that bisects the length of fold C. The length of calculation region R in a direction along fold C is set to be 1/20 of the length of fold C. In FIG. 2, calculation region R is illustrated with being hatched. A region which corresponds to center portion 101C among calculation regions R which have been set is observed by a microscope. Then, a proportion of an area of a region in which all observed adsorbent particles are projected, to this region (the region in calculation region R, which corresponds to center portion 101C) is calculated. Regarding other (n−1) (n is an integer which is greater than or equal to or) sections of filter 10, a calculation region is determined. Regarding the determined calculation region, the area proportion of the adsorbent is calculated in a manner similar to the above descriptions. An average value of the area proportions of the n calculation regions is set to be area proportion Rf1s of the adsorbent. n is preferably greater than or equal to 5 and more preferably greater than or equal to 10.

Area proportion Rf2 of the adsorbent, which replaces density A2 is obtained in the similar manner. That is, a region which corresponds to one end portion 101T among calculation regions R which have been set is observed by a microscope. Then, a proportion of an area of a region in which all observed adsorbent particles are projected, to this region (the region in calculation region R, which corresponds to end portion 101T) is calculated. Similarly, regarding the other end portion 101T, the area proportion of the adsorbent is calculated. Then, the calculated area proportion and the area proportion of one end portion 101T, which has been obtained are averaged. Regarding other (n−1) (n is an integer which is greater than or equal to or) sections of filter 10, a calculation region is determined. Regarding the determined calculation region, the area proportion of the adsorbent is calculated in a manner similar to the above descriptions. An average value of the area proportions in n calculation regions is set to be area proportion Rf2 of the adsorbent. As will be described later, in a case where fiber layer 1 and a porous sheet (first porous sheet) are stacked via a line-like adhesive (referred to as an adhesive line below), the first porous sheet may be peeled and then observation may be performed. Calculation region R may be set to avoid the adhesive line.

Figure 3:
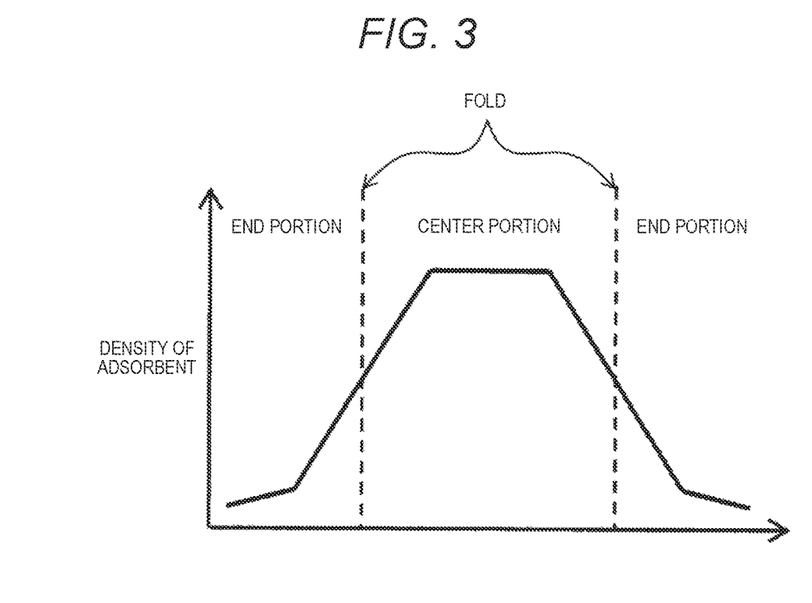
FIG. 3 is a graph illustrating distribution of an adsorbent according to the exemplary embodiment.

The adsorbent has distribution as illustrated in FIG. 3, for example. A peak in the distribution of the adsorbent may be provided in center portion 101C, but the adsorbent may be provided at end portion 101T. In FIG. 3, a vertical axis indicates the density of the adsorbent.

Porous Sheet

Figure 4:
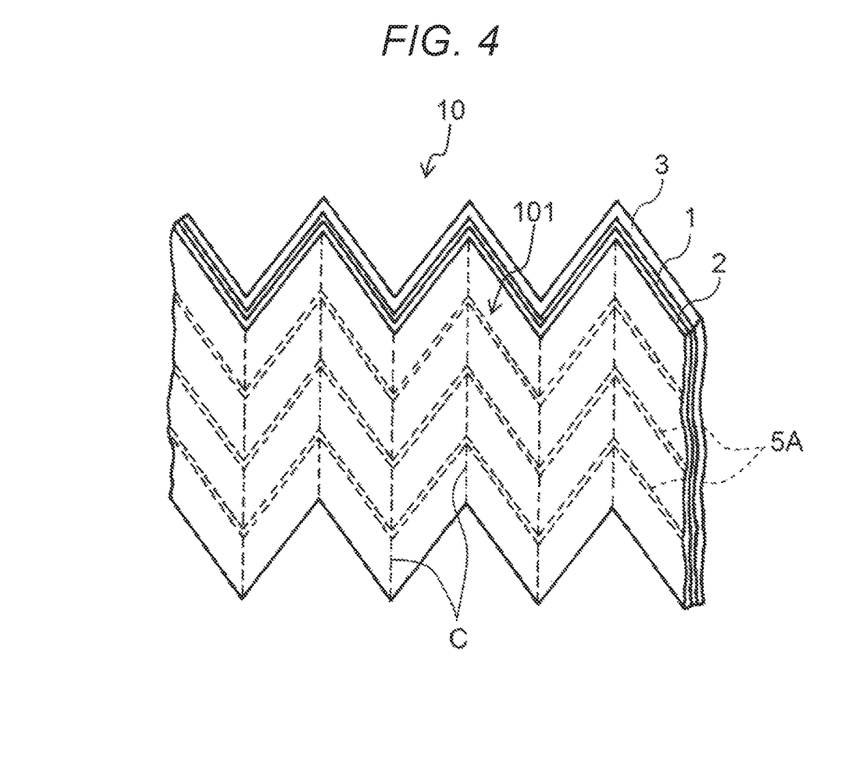
FIG. 4 is a perspective view schematically illustrating another pleated filter according to the exemplary embodiment.

Filter 10 may further include porous sheet 2 (see FIG. 4. Hereinafter, first porous sheet 2). First porous sheet 2 is stacked on fiber layer 1. First porous sheet 2 may be a protective material for protecting fiber layer 1 from various external loads. First porous sheet 2 may be a cover for suppressing an occurrence of falling of the adsorbent held in the first fiber of fiber layer 1. First porous sheet 2 may be a dust collector that captures dust, along with fiber layer 1.

The form and the material of first porous sheet 2 may be appropriately selected in accordance with the purpose of a use. Specifically, a fibrous structure such as fabric, a knitted work, and nonwoven fabric can be exemplified as first porous sheet 2. Among these structures, from a viewpoint of the pressure loss, it is preferable that first porous sheet 2 is nonwoven fabric. In a case where first porous sheet 2 is nonwoven fabric, the material of second fiber constituting first porous sheet 2 is not particularly limited. Examples of the material of the second fiber include glass fiber, cellulose, acrylic resin, PP, polyethylene (PE), PET, PA, and mixtures thereof. As will be described later, from a point of easy charging and easy maintaining of the electrostatic property in a case where first porous sheet 2 is charged, the material of the second fiber is preferably PP. In a case where first porous sheet 2 is nonwoven fabric, a manufacturing method thereof is also not particularly limited. For example, a spunbond method, a dry type method (for example, air laid method), a wet type method, a melt blowing method, and a needle punching method are exemplified. Among the above methods, from a point of easy formation of nonwoven fabric which is suitable for a filter and has a small fiber diameter, first porous sheet 2 is preferably manufactured by the melt blowing method.

First porous sheet 2 may be charged (permanently charged). That is, first porous sheet 2 may semi-permanently hold electric polarization in a state where an external electric field is not provided, and may form an electric field around the periphery of first porous sheet 2. Thus, performance of capturing dust is improved and it is easy to suppress the occurrence of falling of the adsorbent. In this case, a surface potential of first porous sheet 2 (potential difference between first porous sheet 2 which is not charged and charged first porous sheet 2) is not particularly limited. For example, the surface potential thereof may be greater than or equal to 5 kV and smaller than or equal to 100 kV.

Average fiber diameter D2 of the second fiber is preferably greater than that of the first fiber. Average fiber diameter D2 is, for example, greater than or equal to 0.5 μm and smaller than or equal to 20 μm and preferably greater than or equal to 5 μm and smaller than or equal to 20 μm. From a viewpoint of the pressure loss, thickness T2 of first porous sheet 2 is preferably greater than or equal to 100 μm and smaller than or equal to 500 μm, and more preferably greater than or equal to 150 μm and smaller than or equal to 400 μm.

The pressure loss of first porous sheet 2 is not particularly limited. Regarding the pressure loss of first porous sheet 2, initial pressure loss of first porous sheet 2 is preferably about greater than or equal to 1 Pa and smaller than or equal to 10 Pa in a case of being measured by using a measuring device which is based on the standard of JISB9908 Format 1. If the initial pressure loss of first porous sheet 2 is in the range, the pressure loss of the entirety of filter 10 is also suppressed.

From a viewpoint of the pressure loss, the mass of first porous sheet 2 per unit area is preferably greater than or equal to 10 g/m² and smaller than or equal to 50 g/m², and more preferably greater than or equal to 10 g/m² and smaller than or equal to 30 g/m². Porosity of first porous sheet 2 is not particularly limited. From a viewpoint of the pressure loss, the porosity thereof is preferably greater than or equal to 60 volume % and smaller than or equal to 95 volume %, and more preferably greater than or equal to 70 volume % and smaller than or equal to 90 volume %. The porosity (volume %) is represented, for example, by an expression of (1−(apparent mass of first porous sheet 2 per unit volume)/specific gravity of second fiber)×100.

Adhesive

In a case where filter 10 includes fiber layer 1 and first porous sheet 2, both fiber layer 1 and first porous sheet 2 may adhere to each other by an adhesive. In this case, from a viewpoint of the pressure loss, the adsorption performance, and the dust collection performance, the adhesive is preferably formed to be a plurality of lines. For example, plurality of adhesive lines 5A (see FIG. 4) is arranged at a predetermined interval. In particular, adhesive lines 5A are preferably arranged in a direction intersecting with fold C. Filter 10 may be disposed so as to cause fold C to be perpendicular to a horizontal plane. Even in this case, adhesive lines 5A suppress the adsorbent from moving in the direction along fold C and suppress in-plane uniformity of the adsorption performance in section 101 from being decreased. Adhesive lines 5A and fold C may vertically intersect with each other. Adhesive lines 5A and fold C may intersect with each other so as to cause an acute angle formed by adhesive line 5A and fold C to be greater than or equal to 60 degrees and smaller than 90 degrees.

The type of the adhesive is not particularly limited. For example, a hot melt adhesive which has thermoplastic resin as the main component is exemplified. Examples of the thermoplastic resin can include polyester such as polyurethane (PU) and PET, copolymer polyester such as urethane-modified copolymer polyester, PA, and polyolefin (for example, PP and PE). The hot melt adhesive is applied so as, for example, to form adhesive lines 5A on fiber layer 1, while being melted by heating.

It is preferable that adhesive lines 5A are formed by an adhesive which has been provided to be a plurality of broken lines. Thus, it is possible to form adhesive lines 5A between which an interval is wide, with a small used amount. Therefore, it is possible to improve bonding strength between fiber layer 1 and first porous sheet 2, while an increase of the pressure loss is suppressed.

The amount of the provided adhesive is not particularly limited. From a viewpoint of the bonding strength and the pressure loss, the amount of the provided adhesive is preferably greater than or equal to 0.5 g/m² and smaller than or equal to 15 g/m², more preferably greater than or equal to 1 g/m² and smaller than or equal to 10 g/m², and particularly preferably greater than or equal to 3 g/m² to and smaller than or equal 9 g/m².

Second Porous Sheet

Preferably, filter 10 further includes second porous sheet 3 (see FIG. 4). Thus, the shape of pleats (creases) is easily held. That is, second porous sheet 3 is a base that hold the shape of filter 10. In this case, second porous sheet 3 is stacked on a side of fiber layer 1, which is opposite to first porous sheet 2. In a case where fiber layer 1 is formed by an electrospinning method, first fiber may be deposited by setting second porous sheet 3 as a target. It is preferable that a fluid is caused to pass through filter 10 which includes fiber layer 1, first porous sheet 2, and second porous sheet 3, from first porous sheet 2 side. Firstly, large dust is captured by first porous sheet 2, and then finer dust is captured by fiber layer 1. Thus, the dust collection efficiency is improved.

The form and the material of second porous sheet 3 may be appropriately selected in accordance with the purpose of a use. Fibrous structures similar to first porous sheet 2 can be exemplified as the second porous sheet 3. Among the structures, from a viewpoint of the pressure loss, second porous sheet 3 is preferably nonwoven fabric. In particular, second porous sheet 3 is preferably nonwoven fabric manufactured by a wet type method.

In a case where second porous sheet 3 is nonwoven fabric, the material of third fiber constituting second porous sheet 3 is not particularly limited. The same materials as that of the second fiber is exemplified. Among the materials, from a point of being suitable as a base, the material of the third fiber is preferably PET or cellulose. In particular, it is preferable that second porous sheet 3 includes PET and/or cellulose at a proportion which is greater than or equal to 80 mass %. Average fiber diameter D3 of the third fiber is not particularly limited. For example, average fiber diameter D3 thereof may be greater than or equal to 1 μm and smaller than or equal to 40 μm and be greater than or equal to 5 μm and smaller than or equal to 20 μm. Thickness T3 of second porous sheet 3 is not particularly limited. For example, thickness T3 thereof may be greater than or equal to 50 μm and smaller than or equal to 500 μm and be greater than or equal to 150 μm and smaller than or equal to 400 μm.

The mass of second porous sheet 3 per unit area is also not particularly limited. For example, the mass of second porous sheet 3 per unit area may be greater than or equal to 10 g/m² and smaller than or equal to 80 g/m², and be greater than or equal to 35 g/m² and smaller than or equal to 60 g/m². The pressure loss of second porous sheet 3 is not particularly limited. Regarding the pressure loss thereof, initial pressure loss of second porous sheet 3 is preferably about greater than or equal to 1 Pa and smaller than or equal to 10 Pa in a case of being measured by using a measuring device which is based on the standard of JISB9908 Format 1. If the initial pressure loss of second porous sheet 3 is in the range, the pressure loss of the entirety of filter 10 is also suppressed. The porosity of second porous sheet 3 is not particularly limited. From a viewpoint of the pressure loss, the porosity thereof is preferably greater than or equal to 65 volume % and smaller than or equal to 98 volume %.

Method of Manufacturing Stacked Body

Filter 10 in which the adsorbent is concentrated on center portion 101C of section 101 is obtained in a manner as follows. For example, a liquid matter (referred to as an adsorbent liquid below. See the following descriptions) including an adsorbent in fiber layer 1 is sprinkled on filter 10 (hereinafter, stacked body) before pleating, so as to avoid a portion predetermined as fold C (place predetermined as fold C).

A method of manufacturing filter 10 in the exemplary embodiment will be described below by using, as an example, a case of a filter including first porous sheet 2 and second porous sheet 3, in which the first fiber is deposited on second porous sheet 3 by an electrospinning method.

For example, filter 10 can be obtained by a manufacturing method which includes (1) a process of preparing a second porous sheet, (2) a process of forming a fiber layer on one surface of the second porous sheet by depositing the first fiber with an electrospinning method, (3) a process of sprinkling an adsorbent liquid on the fiber layer, (4) a process of drying the adsorbent liquid, (5) a process of coating the fiber layer with an adhesive so as to have a line shape, after the adsorbent is sprinkled, (6) a process of forming a stacked body by stacking the first porous sheet on the fiber layer via the adhesive, and (7) a process of performing pleating of the obtained stacked body. In Process (3) of sprinkling the adsorbent liquid, for example, the adsorbent liquid is discontinuously sprinkled on the fiber layer so as to avoid the portion predetermined as fold C. Either of Process (3) of sprinkling the adsorbent liquid and Process (5) of coating the fiber layer with the adhesive so as to have a line shape may be previously performed. Either of Process (4) of drying the adsorbent liquid and Process (5) of coating the fiber layer with the adhesive so as to have a line shape may be previously performed. Regarding the processes, Process (3), Process (4), and Process (5) are preferably performed in this order, such that Process (5) of coating the fiber layer with the adhesive so as to have a line shape and Process (6) of forming the stacked body are continuously performed. In the following descriptions, a case where Process (3), Process (4), and Process (5) are performed in this order will be described.

Processes (1) to (6) until the stacked body is formed can be performed by a manufacturing system, for example. In the manufacturing system, the second porous sheet is transported from an upstream of the line toward a downstream thereof. The fiber layer is formed on the main surface of the transported second porous sheet. The adsorbent is sprinkled and the adhesive is applied so as to have a line shape. Then, the first porous sheet is stacked. Such a manufacturing system includes, for example, (1) a second porous sheet feeding unit that feeds a second porous sheet to a transport belt, (2) an electrospinning unit that includes an electrospinning mechanism of generating first fiber from a raw material liquid by an electrostatic force and depositing the generated first fiber on the second porous sheet in the middle of being transported, (3) an adsorbent sprinkling unit that sprinkles an adsorbent from a fiber layer side of a complex of the second porous sheet sent from the electrospinning unit and the fiber layer, (4) a heating unit that dries the adsorbent liquid sprinkled on the fiber layer, (5) an adhesive applying unit that applies an adhesive from the fiber layer side of the complex sent from the adsorbent sprinkling unit, so as to have a line shape, and (6) a first porous sheet stacking unit that stacks a first porous sheet from the fiber layer side of the complex sent from the adhesive applying unit, so as to interpose the adhesive.

Figure 5:
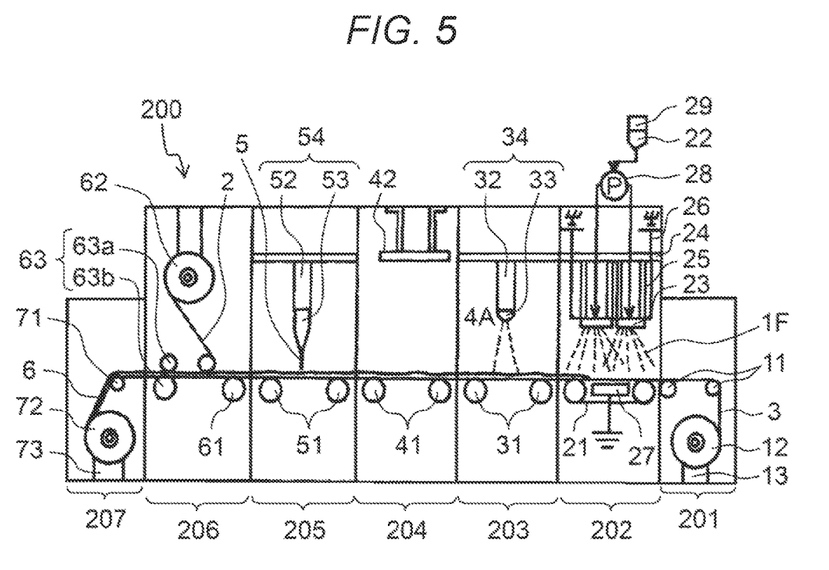
FIG. 5 is a diagram illustrating a configuration example of a portion of a manufacturing system used when the filter according to the exemplary embodiment is manufactured.

In the following descriptions, a method of manufacturing a stacked body which is a precursor of filter 10 and a manufacturing system that performs the method will be described with reference to FIG. 5. However, the embodiment is not limited to the following system and manufacturing method. FIG. 5 is a schematic diagram illustrating a configuration of an example of manufacturing system 200 of a stacked body. Manufacturing system 200 constitutes a manufacturing line for manufacturing stacked body 6.

Firstly, second porous sheet 3 is prepared. In manufacturing system 200, second porous sheet 3 is transported from an upstream side of the manufacturing line toward a downstream thereof. Second porous sheet feeding unit 201 that accommodates second porous sheet 3 which is wound to have a roll shape is provided in the most upstream of manufacturing system 200. Second porous sheet feeding unit 201 rotates first supply reel 12 by motor 13 so as to feed second porous sheet 3 which is wound around first supply reel 12 to transport roller 11.

Second porous sheet 3 is transported to electrospinning unit 202 by transport roller 11. The electrospinning mechanism included in electrospinning unit 202 includes discharging member 23, charging means (see descriptions which will be made later), and transport conveyor 21. Discharging member 23 is installed at an upper portion of the unit and is used for discharging raw material liquid 22 of first fiber 1F. The charging means charges discharged raw material liquid 22 so as to have a positive polarity. Transport conveyor 21 transports second porous sheet 3 which is disposed to oppose discharging member 23, from an upstream side to a downstream side. Transport conveyor 21 functions as a collector unit that collects first fiber 1F along with second porous sheet 3. The number of electrospinning units 202 is not particularly limited. One or two or more electrospinning units may be provided.

In a case where plurality of electrospinning units 202 and/or discharging members 23 is provided, average fiber diameter D1 of formed first fiber 1F may be changed for each of electrospinning units 202 or each of discharging members 23. Average fiber diameter D1 of first fiber 1F can be changed by adjusting discharge pressure of raw material liquid 22, an applied voltage, concentration of the raw material liquid, a distance between discharging member 23 and second porous sheet 3, a temperature, humidity, and the like.

A discharging port (not illustrated) of raw material liquid 22 is provided at a plurality of places on a side of discharging member 23, which opposes the main surface of second porous sheet 3. A distance between the discharging port of discharging member 23 and second porous sheet 3 depends on the size of electrospinning unit 202 or a desired fiber diameter. For example, the distance may be 100 to 600 mm. Discharging member 23 is supported by second support 25 so as to cause a longitudinal direction of discharging member 23 to be parallel to the main surface of second porous sheet 3. Second support 25 is installed at the upper portion of electrospinning unit 202 and is extended downwardly from first support 24 which is provided to be parallel to a transporting direction of second porous sheet 3. First support 24 may move to cause discharging member 23 to slide in a direction perpendicular to the transporting direction of second porous sheet 3.

The charging means includes voltage applying device 26 that applies a voltage to discharging member 23, and counterpart electrode 27 which is installed to be parallel to transport conveyor 21. Counterpart electrode 27 is grounded. Thus, a potential difference (for example, 20 to 200 kV) depending on a voltage which is applied by voltage applying device 26 can be provided between discharging member 23 and counterpart electrode 27. The configuration of the charging means is not particularly limited. For example, counterpart electrode 27 may be charged to have a negative polarity. Instead of providing counterpart electrode 27, a belt portion of transport conveyor 21 may be configured from a conductor.

Discharging member 23 is configured with a conductor and has an elongated shape in a horizontal direction. Discharging member 23 is hollow. A hollow portion functions as an accommodation portion that accommodates raw material liquid 22. Raw material liquid 22 is supplied to the hollow of discharging member 23 from raw material liquid tank 29 by pressure of pump 28 which communicates with the hollow portion of discharging member 23. Raw material liquid 22 is discharged from the discharging port toward the main surface of second porous sheet 3 by the pressure of pump 28. Discharged raw material liquid 22 causes electrostatic explosion, in a charged state while discharged raw material liquid 22 moves in a space (generation space) between discharging member 23 and second porous sheet 3, and thus generates fibrous matter (first fiber 1F). Generated first fiber 1F is deposited on second porous sheet 3 so as to form fiber layer 1. The amount of deposited first fiber 1F is controlled by adjusting discharge pressure of raw material liquid 22, an applied voltage, concentration of raw material liquid 22, a transporting speed of second porous sheet 3, and the like.

A solvent included in raw material liquid 22 may be suitably selected in accordance with the type of raw material resin or a manufacturing condition. For example, the followings can be used: methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl-n-hexyl ketone, methyl-n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, N,N-dimethylacetamide (DMAc), dimethyl sulfoxide, pyridine, and water. The above substances may be singly used or be used in combination of plural kinds thereof. Among the substances, DMAc is preferable from a point of being suitable for the electrospinning method and a point of easily dissolving PES in a case where first fiber 1F including PES is formed by the electrospinning method.

An inorganic solid material may be added to raw material liquid 22. Examples of the inorganic solid material can include oxide, carbide, nitride, boride, silicide, fluoride, and sulfide. Among the substances, from a viewpoint of workability, oxide is preferably used. Examples of the oxide can include $Al_2O_3$, $SiO_2$, $TiO_2$, $Li_2O$, $Na_2O$, MgO, CaO, SrO, BaO, $B_2O_3$, $P_2O_5$, $SnO_2$, $ZrO_2$, $K_2O$, $Cs_2O$, ZnO, $Sb_2O_3$, $As_2O_3$, $CeO_2$, $V_{205}$, $Cr_2O_3$, MnO, $Fe_2O_3$, COO, NiO, $Y_2O_3$, $Lu_2O_3$, $Yb_2O_3$, $HfO_2$, and $Nb_2O_5$. The above substances may be singly used or be used in combination of plural kinds thereof.

A mixing ratio of a solvent and raw material resin in raw material liquid 22 varies depending on the type of the selected solvent and the type of the selected raw material resin. A proportion of the solvent in raw material liquid 22 is, for example, from 60 mass % to 95 mass %.

The electrospinning mechanism that forms first fiber 1F is not limited to the above-described configuration. Any electrospinning mechanism can be used without being particularly limited, so long as the mechanism can generate first fiber 1F from raw material liquid 22 by an electrostatic force and deposit generated first fiber 1F on the main surface of second porous sheet 3 in a predetermined generation space of first fiber 1F. For example, the shape of a section which is perpendicular to the longitudinal direction of discharging member 23 may be a shape (V type nozzle) having the size which is gradually reduced from an upper portion thereof toward a lower portion.

After fiber layer 1 is formed, a complex of second porous sheet 3 and fiber layer 1 is transported to an adsorbent sprinkling unit 203. In adsorbent sprinkling unit 203, adsorbent liquid 4A (for example, a dispersion of an adsorbent, a solution of the adsorbent, or a liquid matter in which a portion of the adsorbent is dissolved and the remainder is dispersed) is discontinuously sprinkled on fiber layer 1 of the complex, so as to avoid a portion predetermined as fold C. A solvent or a dispersion medium which is used for dissolving or dispersing the adsorbent is not particularly limited. The solvent or the dispersion medium may be appropriately selected in accordance with the type of the adsorbent.

A sprinkling method is not particularly limited. Examples of the sprinkling method include a spray method, a sieving method, and a spraying method. Adsorbent sprinkling unit 203 includes sprinkling device 34. Sprinkling device 34 includes adsorbent tank 32 and sprinkling member 33. Adsorbent tank 32 is installed at an upper portion of adsorbent sprinkling unit 203 and accommodates adsorbent liquid 4A. Sprinkling member 33 is used for sprinkling adsorbent liquid 4A.

The adsorbent may be dispersed or dissolved in raw material liquid 22 of first fiber 1F and be deposited on the main surface of second porous sheet 3 along with first fiber 1F by the electrospinning method. In this method, in the generation space, particles of the adsorbent along with first fiber 1F are generated from raw material liquid 22. In the generation space or when the generated particles are deposited on the main surface of second porous sheet 3, the adsorbent is held in first fiber 1F. In this case, for example, the adsorbent can be concentrated on center portion 101C of section 101 by discharging the raw material liquid 22, so as to avoid the portion of second porous sheet 3, which is predetermined as fold C.

After adsorbent liquid 4A is sprinkled and before first porous sheet 2 is stacked, the complex is transported to heating unit 204 which includes heating device 42. Then, the solvent included in first fiber 1F and the dispersion medium and/or the solvent of adsorbent liquid 4A are removed. Heating unit 204 includes a transport roller 41.

Heating device 42 is not particularly limited and may be appropriately selected. A heating temperature may be appropriately selected in accordance with a boiling point of each solvent or the dispersion medium. For example, heating may be performed so as to cause the temperature of the surface of second porous sheet 3 to be about 100° C. to 200° C.

Subsequently, the complex is transported to adhesive applying unit 205. The adhesive is applied onto the fiber layer of the complex. Adhesive applying unit 205 includes adhesive tank 52, applicator 54, and transport roller 51. Adhesive tank 52 is installed at an upper portion of adhesive applying unit 205 and accommodates adhesive 5. Applicator 54 includes nozzle 53 for coating the complex with adhesive 5 so as to form a line-like region. Transport roller 51 transports the complex to a downstream. Adhesive tank 52 or nozzle 53 includes a heating device (not illustrated). Thus, adhesive 5 which is, for example, hot melt resin is discharged with being melted.

Then, the complex is transported to first porous sheet stacking unit 206. In first porous sheet stacking unit 206, first porous sheet 2 is fed from fiber layer 1 side of the complex and is stacked on the complex via the adsorbent and adhesive 5. In a case where first porous sheet 2 is long, similar to second porous sheet 3, first porous sheet 2 may be wound around second supply reel 62. In this case, first porous sheet 2 is stacked on the complex while being unwound from second supply reel 62. First porous sheet stacking unit 206 includes transport roller 61.

After first porous sheet 2 is stacked, stacked body 6 may be pressed while pressure is applied to stacked body 6 by a pair of pressing rollers 63 (63a and 63b) disposed up and down with stacked body 6 interposed therebetween, and thus the complex and first porous sheet 2 may be more adhered to each other.

Stacked body 6 is carried out from first porous sheet stacking unit 206 and is transported to collecting unit 207 which is disposed on a more downstream side, via roller 71. Collecting unit 207 has collecting reel 72 mounted therein, for example. Collecting reel 72 causes transported stacked body 6 to be wound. Collecting reel 72 is rotated and driven by motor 73.

Stacked body 6 wound around collecting reel 72 is cut off to have a desired shape, and then is put into a pleating machine (not illustrated). In the pleating machine, fold C is formed by bending stacked body 6 so as to have a bellows shape. Thus, pleated filter 10 is obtained. Filter 10 is coated with hot melt resin having a bead shape, so as to intersect with formed fold C. Pleats which are adjacent to each other are partially adhered to each other and the pleat shape is held, by the hot melt resin.

According to the disclosure, it is possible to improve adsorption efficiency of a chemical substance by an adsorbent and to suppress an increase of pressure loss in a pleated filter.

In the disclosure, the stacked body has high adsorption efficiency by the adsorbent. Thus, the stacked body is suitable as a filter material of an air cleaner or an air conditioner, a separation sheet for a battery, a membrane for a fuel cell, an external examination sheet such as a pregnancy examination sheet, a medical sheet for cell culture, a dustproof cloth such as a dustproof mask or dustproof clothing, a cosmetic sheet, a wiping sheet that wipes off dust, or the like.

What is claimed is:

1. A filter comprising:
a fiber layer that includes fiber; and
an adsorbent that is held in the fiber and adsorbs a chemical substance, wherein
the filter is divided into a plurality of sections by a fold, each of the plurality of sections includes
a first end portion positioned along the fold,
a center portion adjacent to the first end portion, and
a second end portion counterposing the first end portion with the center portion interposed therebetween, and
density of the adsorbent at the center portion is greater than density of the adsorbent at the first end portion and at the second end portion.

2. The filter of claim 1,
wherein a width of the first end portion is greater than or equal to 5% and smaller than or equal to 25% of a width of the section.

3. The filter of claim 1,
wherein an area of the first end portion is greater than or equal to 5% and smaller than or equal to 25% of an area of the section.

4. The filter of claim 1,
wherein the density of the adsorbent at the center portion is equal to or greater than 1.1 times the density of the adsorbent at the first end portion and at the second end portion.

5. The filter of claim 1, further comprising:
a first porous sheet which is stacked on the fiber layer; and
an adhesive which is interposed between the fiber layer and the first porous sheet, in a direction intersecting with the fold.

6. The filter of claim 5,
wherein the adhesive is provided to form a plurality of lines.

7. The filter of claim 5,
wherein the adhesive is provided to form a plurality of broken lines.

8. The filter of claim 5, further comprising:
a second porous sheet,
wherein the fiber layer is interposed between the first porous sheet and the second porous sheet.

9. The filter of claim 1,
wherein an average fiber diameter of the fiber included in the fiber layer is greater than or equal to 50 nm and smaller than or equal to 3 µm.

* * * * *